Sept. 10, 1968  R. W. CONAWAY ET AL  3,400,854

ANTI-SLOSH MEDIA FOR FUEL TANKS

Original Filed Sept. 17, 1965  2 Sheets-Sheet 1

INVENTOR.
ROBERT W. CONAWAY
JAMES S. SPINDLER

ATTORNEY

Sept. 10, 1968     R. W. CONAWAY ET AL     3,400,854
ANTI-SLOSH MEDIA FOR FUEL TANKS
Original Filed Sept. 17, 1965     2 Sheets-Sheet 2

INVENTOR.
ROBERT W. CONAWAY
JAMES S. SPINDLER

ATTORNEY

United States Patent Office 3,400,854
Patented Sept. 10, 1968

3,400,854
ANTI-SLOSH MEDIA FOR FUEL TANKS
Robert W. Conaway and James S. Spindler, Akron, Ohio, assignors to The Goodyear Tire & Rubber Company, Akron, Ohio, a corporation of Ohio
Original application Sept. 17, 1965, Ser. No. 488,222, now Patent No. 3,349,953, dated Oct. 31, 1967. Divided and this application Oct. 26, 1967, Ser. No. 678,291
3 Claims. (Cl. 220—85)

ABSTRACT OF THE DISCLOSURE

A baffle system which may be inserted into fuel tanks or other liquid containers to prevent sloshing of the liquid. The tank is filled with hollow plastic objects. Each object has a perforated wall to permit liquid in the container to fill both the inside of the objects and the voids between the objects and to prevent entrapment of liquid in the tank as it is emptied.

Cross-reference to related applications

This is a division of our copending application, Ser. No. 488,222, filed the 17th day of September 1965, now Patent No. 3,349,953.

This invention relates to tanks for containing liquid fuel and more particularly to a fuel tank structure for racing cars and other vehicles.

Background of the invention

Fuel tanks and racing cars are subjected to sudden changes in acceleration and deceleration forces which cause rapid surges of fuel to one part of the tank or sloshing back and forth of the fuel within the tank; for example, when a racing car is going into a turn, the deceleration force and the centrifugal force cause the fuel to flow to the front of the tank and to the side of the tank nearest the outer edge of the track. As the car comes out of the turn, the fuel surges back across the center of the tank and tends to slosh back and forth for a certain length of time, thereby shifting the weight of the fuel in the car and making it difficult to steer.

Various types of baffles have been used in fuel tanks in the past in an attempt to reduce the sudden surge of fuel from one part of a fuel tank to another and the sloshing of fuel in the tank. An example of such structures may be seen in the following patents: 2,214,330, A. J. Henderson et al.; 2,354,707, M. G. P. Pescara; and 2,850,083, J. G. M. Frost.

Although the prior art devices have helped alleviate this problem to some extent, many of them are not entirely satisfactory since they are complicated to build and install in the tank and they must be designed to fit a fuel tank of a particular size and contour. The prior art devices must normally be installed in the fuel tank prior to completion of the tank casing.

Objects of the invention

It is the primary object of this invention to provide an anti-slosh baffle system for fuel tanks which will fit any fuel tank regardless of the size and contour of a tank casing.

Another important object of this invention is to provide a baffle system which may easily be installed in a fuel tank which is already installed on a vehicle.

A further object of this invention is to provide a structure which is inexpensive, light weight, and easy to install.

Still another important object of this invention is to provide a baffle system which requires no mechanical fastening to the tank casing.

A still further object of this invention is to provide a baffle system which will support a flexible inner-liner in the tank and eliminate the need for connecting the inner-liner to the outer casing of the tank.

These and other objects and advantages of the invention will become apparent in the following specification and the attached drawings in which.

Figure 1:
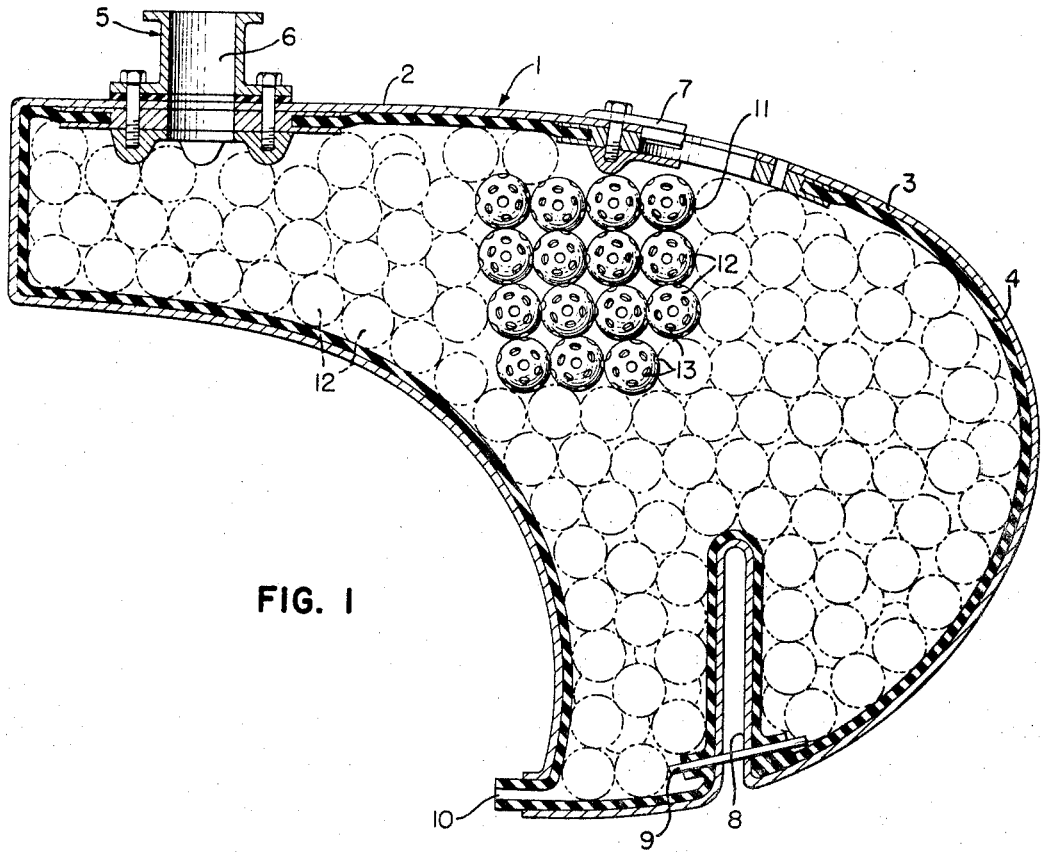
FIG. 1 is a cross-sectional view through a fuel tank with a baffle system therein.
Figure 3:
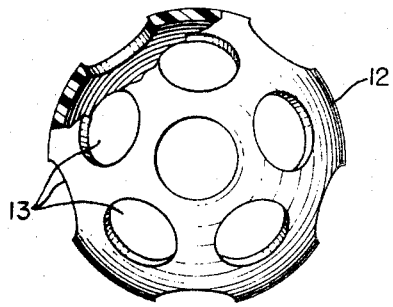
FIG. 3 is a partially broken-away perspective view of one of the hollow spherical baffle members used in the baffle systems of FIGS. 1 and 2.

Referring now to the drawings and in particular to FIG. 1, numeral 1 indicates generally a fuel tank for a racing car. The fuel tank 1 has a casing 2 consisting of an outer metal shell 3 and an inner-liner 4 of rubber or other flexible fluid impervious material positioned therein and of a size and contour which conforms to that of the interior of the shell 3. The fuel tank 1 has a fuel filler fitting indicated generally by the numeral 5 having an opening 6 therethrough. The fitting 5 is of a conventional type which is used on many fuel tanks to retain the opening in the outer shell 3 and inner-liner 4 in alignment and to receive a closure cap (not shown). This fitting will not be described in detail since it does not form a part of the invention and any type of conventional fitting for fuel tank openings may be used. The fuel tank 1 also has an access fitting 7, the construction of which is quite similar to that of the fitting 5. The fitting 7 provides access to the inside of the fuel tank casing 2 for inserting the inner-liner 4 into the shell 3 or for performing any other necessary work on the inside of the fuel tank. The irregular contour of the fuel tank 1 shown in FIG. 1 is of a type used in some of the automotive racing cars. The fuel tank 1 has an indentation 8 running transversely across the bottom portion of the tank to permit the tank to fit over a structural member of the automobile. The indentation 8 divides the tank bottom into a front and rear section. Tube 9 connects the rear section of the tank bottom which lies behind the indentation 8 with the front section of the tank bottom. This permits the passage of fuel from the rear portion of the tank to the front so that it does not become entrapped behind the indentation 8. A fuel outlet line 10 is attached to the bottom portion of the tank 1 and ultimately leads through a fuel pump to carburetor (not shown). The numeral 11 represents a baffle system located within the fuel tank consisting of a plurality of individual disconnected hollow spherical baffle members 12. A detailed view of one of these baffle members may be seen in FIG. 3 which shows one of the baffle members 12 consisting of a hollow thin-walled spherical plastic object having a plurality of openings 13 through the wall thereof.

To illustrate the invention the baffle members 12 are shown as made of polyethylene; however, they may be made of other plastics, metal or any other suitable material which is impervious to the fuel blends used in the tank. Although the spherical baffle member shown is the preferred embodiment, it is obvious that many other shapes and configurations of baffle members can be used without departing from the broad concept of the invention. The baffle members 12 may be dropped into the fuel tank 1 through the fuel filler fitting 5 either before or after the fuel tank is mounted on the vehicle. The baffle members 12 must, of course, be small enough to pass through the opening 6 in the fitting 5. Depending upon the size of the fuel tank and the size of baffle members to be used, a sufficient number of baffle members 12 are dropped into the tank to fill the tank and form a baffle system therein to prevent sudden surges of fuel from one part of the tank to the other due to acceleration and deceleration forces. If it is necessary to use baffle members which are too large to pass through the opening 6 in the fuel filler fitting 5, then the baffle members may be inserted into the tank through the access fitting 7. After the spherical baffle members 12 are dropped into the tank, they will position themselves in such a manner that each baffle member 12 is tangent to one or more of the other adjacent baffle members and part of the baffle members will be tangent to the inner-tank liner 4. The baffle members 12 in addition to preventing undesirable slosh of fuel in the fuel tank 1 also serve the dual function of internally supporting the flexible inner-liner 4 to prevent it from collapsing within the shell 3 when the tank is empty. By filling the inner-liner 4, the baffle members 12 eliminate the need for fastening the inner-liner to the shell 3 by hooks, snaps or any of the conventional methods for supporting a flexible liner within a fuel tank.

Figure 2:
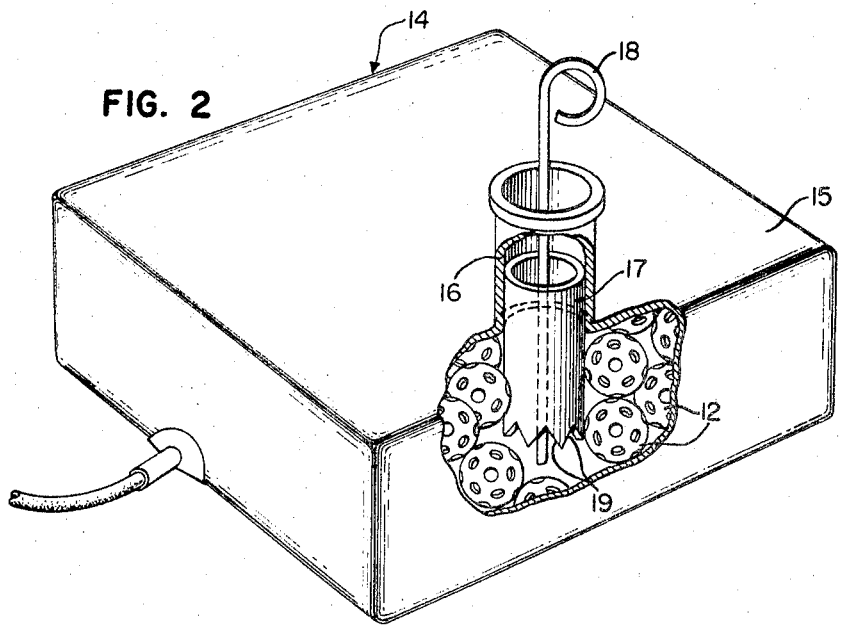
FIG. 2 is a perspective view of another configuration of a fuel tank using a baffle system similar to that shown in FIG. 1.

Another embodiment of this invention is illustrated by the fuel tank 14 havng a casing 15 shown in FIG. 2. To simplify the description of the invention, the casing 14 is shown as having a single layer wall although it could be made with an inner-liner such as the liner 4 in FIG. 1. The fuel tank 14 has a fuel filler conduit 16 located on the top of the fuel tank. An access tube 17 is mounted within the conduit 16 to provide a passage way for inserting a dip stick 18 or other fuel measuring device to measure the amount of fuel in the tank. It may be seen that if the baffle members are dropped into the tank 14 in sufficient quantity to fill the tank without the use of the access tube, they will provide an obstruction which makes it difficult to reach the bottom of the tank with the dip stick 18 and measure the fuel level. To overcome this difficulty after the baffle members 12 have been dropped into position, the access tube 17 is pushed into the tank 14 thereby forcing aside the baffle members 12 to make room for the access tube 17 and permit it to penetrate to the bottom of the tank 14. The access tube 17 has a plurality of notches 19 on the bottom thereof to permit the fuel in the tank to rise to the same level in the tube 17 as the level of the fuel in the rest of the tank when the tube 17 is touching the bottom of the tank. It may be seen that a similar access tube may also be used in conjunction with the tank 1 shown in FIG. 1, or in other types of fuel tanks. A tank having an irregular contour such as the tank shown in FIG. 1, however, may require either a longer tube or insertion of the tube in a different location from the fuel filler fitting 5 shown in FIG. 1.

Figure 4:
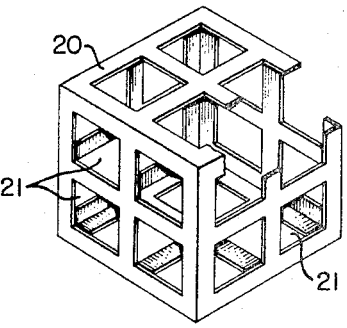
FIG. 4 is another type of baffle member which may be used in the fuel tanks shown in FIGS. 1 and 2 and other types of tanks.

FIG. 4 shows a hollow cube-shaped baffle member 20 which may be used in the type of fuel tanks shown in FIGS. 1 and 2 or in other fuel tanks. The baffle member 20 has square openings 21 in the walls thereof.

Figure 5:
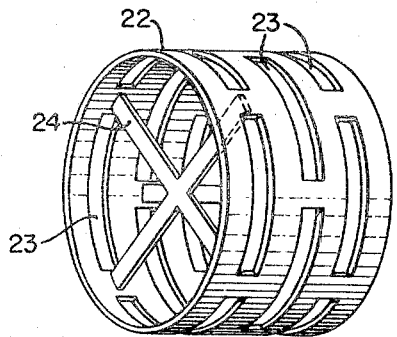
FIG. 5 is another type of baffle member which may also be used with the fuel tanks shown in FIGS. 1 and 2 and other types of tanks.

A cylindrical baffle member 22, shown in FIG. 5, has a plurality of openings 23 around the circumference of the cylinder wall and a plurality of X shaped members 24 mounted inside the cylinder and lying in a plane perpendicular to the longitudinal axis of the cylinder. It is obvious that many types of baffle member configurations may be used to form a baffle system of the type required for this invention. The spherical baffle members 12 of the type shown in FIGS. 3 constitute the preferred embodiment of the invention because of their inherent characteristic of positioning themselves within any irregular shaped tank. This is due to their tendency to roll toward any low spots in the tank and fill in any irregular pockets or indentations in the wall of the tank.

Although the baffle system of this invention has been shown as used in fuel tanks, it may be equally applicable in any type of liquid storage tank where sudden surges of liquid in the tank are undesirable. An example of such a tank would be submerged barges used in offshore drilling operations or in sea-going fuel tankers.

While certain representative embodiments and details have been shown for the purpose of illustrating the invention, it will be apparent to those skilled in this art that various changes and modifications may be made therein without departing from the spirit or scope of the invention.

What is claimed is:
1. A tank structure for storing liquid substances comprising:
   (A) a casing having a liquid inlet opening,
   (B) a baffle system within the casing, said baffle system comprising:
      (1) a plurality of hollow objects, each having a plurality of transverse elements extending between the outer boundary elements thereof, loosely placed within the interior of the casing in sufficient quantity to substantially occupy all the cavity in the casing.
      (2) each object comprising a three-dimensional structure of integral interconnected elements, said structure forming an open-celled, low-density object,
      (3) the open cells of one object being in communication with the open cells of each adjacent object when placed in the casing, thereby permitting the flow of liquid through the entire baffle system to all parts of the interior of the casing but preventing undesirable sudden surges of liquid to one part of the tank due to acceleration and deceleration forces, and
      (4) said objects being of a size which will permit them to be placed in the casing through the inlet opening after the tank is completely assembled.

2. The storage tank structure of claim 1 wherein the open-celled objects are of cylindrical contour.

3. The storage tank structure of claim 1 wherein celled objects are of rectangular parallelepipedic contour.

References Cited
UNITED STATES PATENTS

| | | | |
|---|---|---|---|
| 1,080,263 | 12/1913 | Coleman | 220—88 |
| 2,305,923 | 12/1942 | Held | 220—88 |
| 3,329,759 | 7/1967 | Rice | 264—321 |

THERON E. CONDON, *Primary Examiner.*

J. R. GARRETT, *Assistant Examiner.*